United States Patent [19]

Hulsing, II et al.

[11] Patent Number: 5,379,639
[45] Date of Patent: Jan. 10, 1995

[54] COMBINED FORCE TRANSDUCER AND TEMPERATURE SENSOR

[75] Inventors: Rand H. Hulsing, II, Redmond; Charles K. Lee, Seattle; Steven A. Foote, Issaquah, all of Wash.

[73] Assignee: AlliedSignal Inc., Morris Township, Morris County, N.J.

[21] Appl. No.: 988,444

[22] Filed: Dec. 10, 1992

[51] Int. Cl.6 .............................. G01P 15/00
[52] U.S. Cl. .................... 73/517 AV; 73/497; 73/862.59; 73/862.623; 73/862.639; 374/142; 374/117
[58] Field of Search ........... 73/517 AV, 497, 862.637, 73/862.639, 862.41, 704, 702, 597, 708, 862.59, 862.623; 374/142, 117

[56] References Cited

U.S. PATENT DOCUMENTS

| | | | |
|---|---|---|---|
| 4,258,572 | 3/1981 | Loper, Jr. | 73/497 |
| 5,005,413 | 4/1991 | Novack et al. | 73/517 AV |
| 5,186,053 | 2/1993 | Egley et al. | 73/517 AV |
| 5,187,986 | 2/1993 | Takebe et al. | 73/497 |
| 5,265,473 | 11/1993 | Funabashi | 73/517 AV |

FOREIGN PATENT DOCUMENTS

| | | | |
|---|---|---|---|
| 0467514A2 | 1/1992 | European Pat. Off. | G05D 3/14 |
| 2251948A | 7/1992 | United Kingdom | G01D 3/04 |
| WO90/10237 | 9/1990 | WIPO | G01P 15/10 |

OTHER PUBLICATIONS

Database WPI, Week 8438, Derwent Publications Ltd., London, GB; AN 84-236074 & SU, A, 1 068 739 (Barzhin) 23 Jan. 1984, see abstract.

Primary Examiner—Richard E. Chilcot, Jr.
Assistant Examiner—Joseph L. Felber
Attorney, Agent, or Firm—Howard G. Massung

[57] ABSTRACT

A combined transducer that measures force or displacement and temperature utilizes a pair of vibrating tines to provide a simultaneous output representative of temperature and force or displacement whereby the sum or average of the vibrating frequencies of the two tines is representative of temperature and the difference is representative of force or displacement.

11 Claims, 1 Drawing Sheet

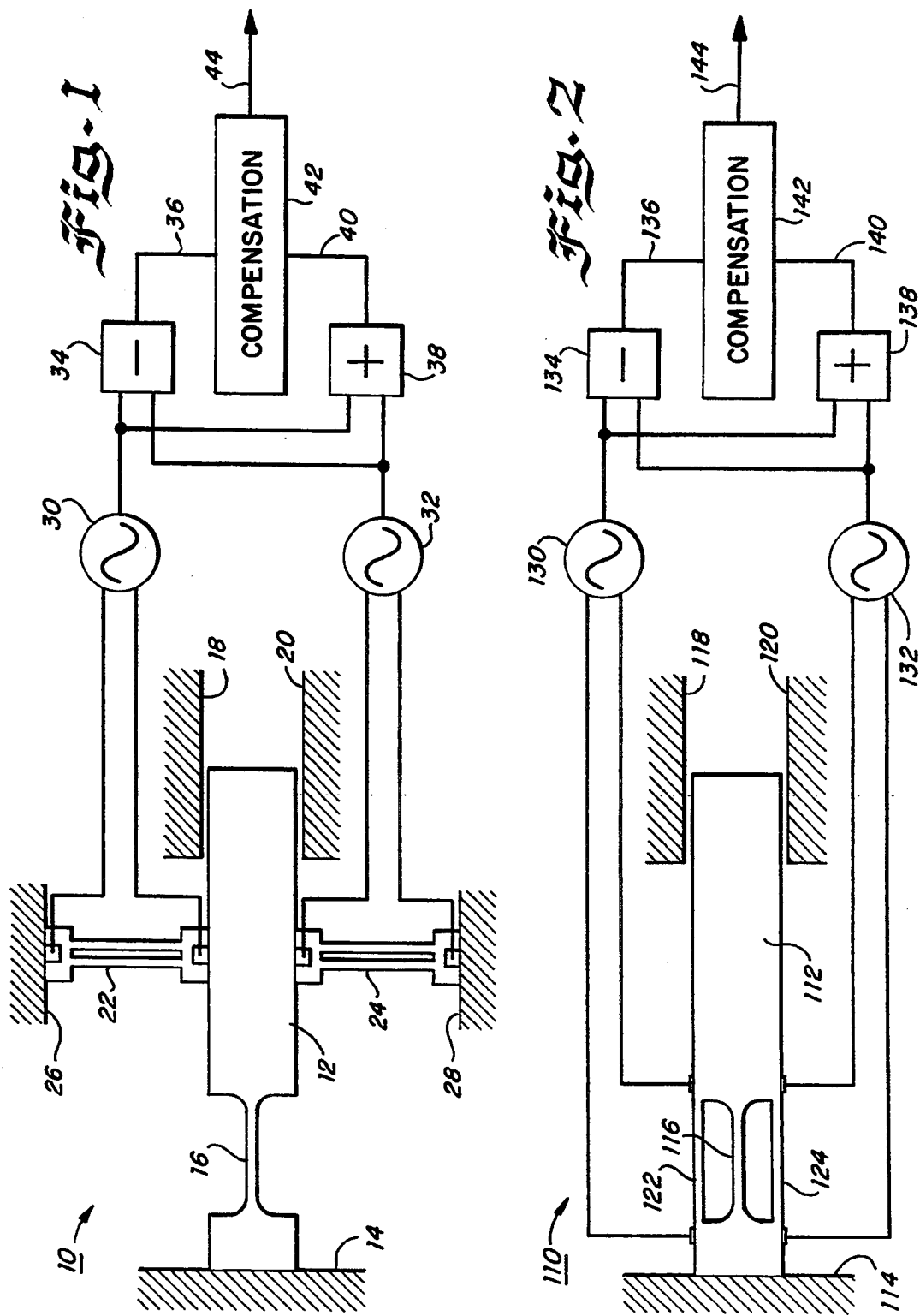

COMBINED FORCE TRANSDUCER AND TEMPERATURE SENSOR

BACKGROUND OF THE INVENTION

1. Field of the Invention

The present invention relates generally to transducers such as force and displacement transducers including accelerometers and, more particularly, to such transducers that also provide an output representative of temperature.

2. Description of the Prior Art

Transducers are generally sensitive to temperature. In order to compensate for temperature-induced errors and to improve the accuracy of the transducer, the temperature in the vicinity of the transducer is measured and used for compensation purposes. Generally, this requires attaching a thermal sensor to a convenient point on or near the transducer being compensated. Circuitry is also provided to convert the output of the thermal sensor into a temperature representative signal suitable for input to an analog-to-digital converter or a voltage-to-frequency converter. However, these approaches require the use of additional parts that may add heat and potentially interfere with the transducer, and because of their spacing from the transducer, such sensors may not provide an accurate measurement of the transducer temperature.

SUMMARY

Accordingly, it is an object of the present invention to overcome many of the disadvantages of the prior art systems.

It is another object of the present invention to provide a force or deflection transducer that also provides a signal representative of measurement without using a separate thermal sensing component.

It is another object of the present invention to provide a deflection or force transducer that provides an indication of temperature at the exact location of the force or deflection sensing element.

It is yet another object of the present invention to provide a vibratory force or deflection transducer that utilizes the vibrating frequency of a pair of vibratory sensing elements to provide both an indication of force or deflection and temperature.

It is yet another object of the present invention to provide a transducer such as an accelerometer having a pair of vibratory sensors attached to a deflection member, wherein the difference in the vibrating frequencies of the two sensors is representative of the deflection of the deflectable member and the average of the vibrating frequencies of the two sensors is representative of temperature.

Accordingly, in accordance with a preferred embodiment of the invention, there is provided a force or deflection transducer, such as, for example, an accelerometer that has a deflectable element such as a proof mass that moves in response to an external force, such as acceleration. Attached to the proof mass are a pair of vibratory sensor elements that are coupled to the proof mass in a manner such that deflection of the proof mass causes the vibrating frequency of one of the vibratory sensor elements to increase and the vibrating frequency of the other to decrease. Circuitry responsive to the difference in the vibrating frequencies of the two sensing elements is used to provide an indication of the deflection of the proof mass and, consequently, the acceleration applied to the accelerometer. In addition, circuitry responsive to the sum or average of the two vibrating frequencies is utilized to provide a signal representative of the temperatures of the two vibratory members. The temperature measurement thus obtained may be utilized to compensate the force transducer for variations in readings caused by temperature.

BRIEF DESCRIPTION OF THE DRAWING

These and other objects and advantages of the present invention will become readily apparent upon consideration of the following detailed description and attached drawing, wherein:

FIG. 1 is a schematic diagram illustrating a combined transducer and temperature sensor according to the present invention; and FIG. 2 is a schematic diagram of an embodiment of the system of FIG. 1 utilizing a monolithic structure as the deflectable member and vibratory transducer elements.

DETAILED DESCRIPTION OF THE PREFERRED EMBODIMENT

Referring now to the drawing with particular attention to FIG. 1, the system according to the invention is shown in an accelerometer embodiment; however, it should be understood that the invention is also applicable to other transducer systems, including various force and displacement transducers. The system according to the invention illustrated in FIG. 1 and generally designated by the reference numeral 10 utilizes a proof mass 12 to sense acceleration. The proof mass 12 is supported by a mounting structure 14 and is allowed to rotate upwardly or downwardly in response to acceleration by a reduced cross-sectional area flexure 16. A pair of mechanical shock stops 18 and 20 limit the mechanical travel of the proof mass 12 and the spacing between the proof mass 12 and the mechanical stops 18 and 20 serves as a damping gap. A pair of vibratory elements 22 and 24 which may be single-tine or multiple-tine vibratory elements fabricated, for example from quartz or silicon, preferably silicon, are affixed to the proof mass 12 and to a pair of supporting members 26 and 28. The vibratory member 22 forms part of the feedback loop for an oscillator 30 and determines the frequency of the oscillator 30. Similarly, the vibratory member 24 forms part of the feedback circuit for another oscillator 32 and determines the frequency of the oscillator 32. The vibratory members 22 and 24 are illustrated as twin tine tuning forks in FIG. 1, but various configurations of single and multiple tine vibratory members may be used. A difference circuit 34 coupled to the oscillators 30 and 32 provides an output signal along a line 36 representative of the frequency difference between the output signals of the oscillators 30 and 32. Similarly, a frequency summing or averaging circuit 38 provides an output on a line 40 representative of the sum or average of the frequencies supplied by the oscillators 30 and 32. The use of a sum or an average is equivalent because the average is simply the sum of the oscillator frequencies divided by two when two oscillators are employed or, more generally, the sum of the frequencies of multiple oscillators divided by the number of oscillators. The average and the sum are simply related by an integer and the terms average and sum will be used interchangeably in describing the invention.

The outputs of the sum and difference circuits 38 and 34 are applied to a compensation circuit 42 that provides a compensated acceleration signal on a line 44. Various known circuitry may be utilized as the compensation circuit 42, such as, for example, a computation circuit that computes the corrected acceleration based on the values of the temperature signal and the uncorrected acceleration signal, or a look-up table that has the corrected accelerations stored therein for various combinations of temperature and uncorrected acceleration.

In operation, when a vertical component of acceleration is applied to the system shown in FIG. 1, the proof mass is deflected upwardly or downwardly depending on the direction of the acceleration. The deflection of the proof mass 12 causes one of the vibratory members 22 and 24 to be compressed and the other one to be extended. This causes the resonant frequency of the compressed vibratory member to decrease and the frequency of the extended vibratory member to increase, thereby decreasing and increasing the oscillation frequencies of the oscillators 30 and 32 connected to the respective compressed and extended vibratory members. The magnitude of the extension and compression of the vibratory members 22 and 24 is determined by the magnitude of the acceleration applied to the system, and consequently, the increase or decrease in the oscillation frequencies of the oscillators 30 and 32 is determined by the magnitude of the acceleration. Thus, by taking the difference in the oscillation frequencies of the oscillators 30 and 32, an indication of the magnitude of the acceleration may be obtained.

Although a dual-vibratory element system of the type illustrated in FIG. 1 is designed to cancel out various common mode errors, the difference in the vibrating frequencies of the vibratory members 22 and 24 is still affected by temperature. Thus, the frequency difference must be compensated for the effects of temperature as previously discussed to obtain an accurate accelerometer reading. Such compensation can be achieved without the use of external sensors by determining the average vibrating frequency of the two vibratory elements 22 and 24 which varies as a function of temperature. By determining the variation of the average frequency of the two vibratory elements as a function of temperature, such a variation can be utilized to compensate for temperature-induced errors in the accelerometer signal.

The average frequency of the vibratory elements 22 and 24 can be determined by taking the sum of the frequencies of the oscillators 30 and 32 and dividing by two, or in the alternative by simply adding the two frequencies since the sum is representative of the average. The average or sum can then be applied to the compensation circuit 42 along with the uncorrected acceleration signal to provide the corrected acceleration signal.

The complement to this process is also true, where the difference signal 36 representative of acceleration may be used to compensate the uncorrected temperature signal and can be used to provide a more accurate compensation for the acceleration signal. This process can be applied repetitively to refine the accuracy or may be modeled in the form of an equation or look-up table.

While the system illustrated in FIG. 1 schematically illustrates the operation of the invention, the transducer is preferably fabricated as a monolithic block, preferably of silicon, as schematically illustrated in FIG. 2. In the diagram of FIG. 2, components analogous to those illustrated in FIG. 1 are assigned identical tens and units digits preceded by a one-hundreds digit. The main difference between the diagram of FIG. 2 and that of FIG. 1 is that the vibrating force elements 122 and 124 are horizontal rather than vertical and are integrally formed from a single block of silicon along with the proof mass 112, the flexure 116 and the supporting end affixed to the supporting member 114.

A practical version of a silicon monolithic accelerometer assembly usable in conjunction with the present invention is disclosed in U.S. Pat. No. 5,005,413 assigned to the same assignee as the assignee of the present invention and incorporated herein by reference. The aforesaid United States patent discloses a silicon micromachined accelerometer that is fabricated from a single crystal layer and employs two double-ended tuning forks as force sensing elements. Such a system may be utilized in conjunction with the present invention by utilizing the double-ended tuning forks disclosed in the patent as the vibratory elements 22 and 24 or 122 and 124 of FIGS. 1 and 2 as discussed above.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. A transducer for providing a signal representative of mechanical deflection and of temperature, comprising:
    a deflectable member;
    a pair of vibratory members affixed to said deflectable member, said deflectable member and said vibratory members cooperating to cause the frequency of vibration of one of said members to increase and the frequency of vibration of the other to decrease upon deflection of the deflectable member, the difference in the frequencies of vibration being indicative of the magnitude of the deflection of the deflectable member; and
    means for providing a signal representative of the average frequency of vibration of said vibratory members, said average frequency representative signal being representative of temperature.

2. A transducer as recited in claim 1, wherein said deflectable member and said vibratory members are integrally formed.

3. A transducer as recited in claim 2, wherein said deflectable member includes an acceleration responsive proof mass.

4. A transducer as recited in claim 3, wherein said deflectable member and said vibratory members are formed from a crystalline material.

5. A transducer as recited in claim 4, wherein said crystalline material is silicon.

6. A transducer as recited in claim 5, wherein said vibratory members have two vibratory tines.

7. A method for providing a signal representative of deflection and temperature, comprising:
    coupling a pair of vibratory members to a deflectable member in a manner such that deflection of the deflectable member causes the vibrating frequency of one of said vibratory members to increase and the vibrating frequency of the other vibrating member simultaneously to decrease;

determining the difference in vibrating frequencies, said difference being representative of the deflection of said deflectable member; and determining the average vibrating frequency of said vibratory members, said average frequency being representative of temperature.

8. A combined accelerometer and temperature sensor, comprising:

a proof mass;

a pair of vibratory members affixed to said proof mass, said proof mass and said vibratory members cooperating to cause the vibrating frequency of one of said members to increase and the other vibrating frequency of the other to decrease in response to deflection of the proof mass caused by acceleration applied to the accelerometer;

means responsive to said vibratory members for providing a signal representative of the difference in the vibrating frequencies of said members, the difference in vibrating frequencies being indicative of the magnitude of the applied acceleration; and means for providing a signal representative of the average vibrating frequency of said vibratory members, the average vibrating frequency of said members being representative of temperature.

9. The combined accelerometer and temperature sensor recited in claim 8, further including means responsive to said vibrating frequency average signal and said acceleration representative signal for compensating said frequency average signal to provide an acceleration compensated temperature signal thereby to provide a more accurately temperature compensated acceleration signal.

10. The combined accelerometer and temperature sensor recited in claim 8, further including means responsive to said vibrating frequency difference signal and said temperature representative signal for compensating said frequency difference signal to provide a temperature compensated acceleration signal.

11. The combined accelerometer and temperature sensor recited in claim 10, further including means responsive to said vibrating frequency average signal and said acceleration representative signal for compensating said frequency average signal to provide an acceleration compensated temperature signal thereby to provide a more accurately temperature compensated acceleration signal.

* * * * *